US012687038B2

(12) United States Patent
Di Sario et al.

(10) Patent No.: US 12,687,038 B2
(45) Date of Patent: Jul. 21, 2026

(54) ELECTROMECHANICAL LOCKING DEVICE

(71) Applicant: DORMAKABA SCHWEIZ AG, Wetzikon (CH)

(72) Inventors: Franco Di Sario, Wetzikon (CH); Markus Zahner, Wetzikon (CH)

(73) Assignee: DORMAKABA SCHWEIZ AG, Wetzikon (CH)

(*) Notice: Subject to any disclaimer, the term of this patent is extended or adjusted under 35 U.S.C. 154(b) by 0 days.

(21) Appl. No.: 18/714,964

(22) PCT Filed: Dec. 1, 2022

(86) PCT No.: PCT/EP2022/084123
§ 371 (c)(1),
(2) Date: May 30, 2024

(87) PCT Pub. No.: WO2023/099691
PCT Pub. Date: Jun. 8, 2023

(65) Prior Publication Data

US 2024/0418010 A1 Dec. 19, 2024

(30) Foreign Application Priority Data

Dec. 3, 2021 (EP) .................................... 21212263

(51) Int. Cl.
*E05B 47/06* (2006.01)
*E05B 15/04* (2006.01)
*E05B 47/00* (2006.01)

(52) U.S. Cl.
CPC .... *E05B 47/0619* (2013.01); *E05B 2015/042* (2013.01); *E05B 2047/0063* (2013.01); *E05B 2047/0088* (2013.01)

(58) Field of Classification Search
CPC ......... E05B 47/0619; E05B 2047/0063; E05B 2047/0088; E05B 2015/042
(Continued)

(56) References Cited

U.S. PATENT DOCUMENTS 5,552,777 A * 9/1996 Gokcebay ........... E05B 47/0611 340/5.67
10,145,147 B2 * 12/2018 Ferreira .................. F16D 67/06
(Continued)

FOREIGN PATENT DOCUMENTS

CN 1307662 A * 8/2001 ......... E05B 47/0642
CN 105121761 A 12/2015
(Continued)

OTHER PUBLICATIONS

International Search Report for Application No. PCT/EP2022/084123, dated Feb. 6, 2023, 2 pages.
(Continued)

*Primary Examiner* — Kristina R Fulton
*Assistant Examiner* — James Edward Ignaczewski
(74) *Attorney, Agent, or Firm* — CANTOR COLBURN LLP

(57) ABSTRACT

An electromechanical locking device for a closure element includes a stator, a rotor, a locking element and a blocking element, wherein the rotor is mounted in the stator, wherein the locking element is movable between two positions, wherein a starting position and a release position can be assumed by the blocking element. In the starting position, the blocking element prevents a movement of the locking element into the second position and in the release position the blocking element enables a movement of the locking element into the second position. The locking device includes a spring element, wherein the spring element interacts with the blocking element such that when the blocking element moves from the starting position into the release position, the spring element is at least temporarily tensioned in such a way that the spring element pushes the blocking element back in the direction of the starting position.

14 Claims, 6 Drawing Sheets

(58) Field of Classification Search
USPC .............................................................. 70/277
See application file for complete search history.

(56) References Cited

U.S. PATENT DOCUMENTS

| | | | | |
|---|---|---|---|---|
| 2008/0134736 | A1* | 6/2008 | Andersson | E05B 27/0082 70/279.1 |
| 2013/0305792 | A1* | 11/2013 | Lien | E05B 47/0642 70/278.7 |
| 2020/0270904 | A1* | 8/2020 | Lee | E05B 17/10 |
| 2022/0064995 | A1* | 3/2022 | Chen | E05B 63/18 |

FOREIGN PATENT DOCUMENTS

| | | | | |
|---|---|---|---|---|
| CN | 107558821 | A | 1/2018 | |
| EP | 1134335 | A2 * | 9/2001 | E05B 47/063 |
| EP | 1636454 | B1 * | 5/2008 | E05B 47/0649 |
| EP | 2886756 | A1 | 6/2015 | |
| EP | 1904702 | B1 * | 12/2015 | E05B 47/06 |
| FR | 2655367 | A1 | 6/1991 | |
| WO | WO-2014016283 | A1 * | 1/2014 | E05B 47/026 |

OTHER PUBLICATIONS

Written Opinion for Application No. PCT/EP2022/084123, dated Feb. 6, 2023, 3 pages.

* cited by examiner

ELECTROMECHANICAL LOCKING DEVICE

CROSS-REFERENCE TO RELATED APPLICATIONS

This application is a 35 U.S.C. § 371 National Stage patent application of PCT/EP2022/084123, filed on 1 Dec. 2022, which claims the benefit of European patent application 21212263.4, filed on 3 Dec. 2021, the disclosures of which are incorporated herein by reference in their entirety.

TECHNICAL FIELD

The disclosure relates to an electromechanical locking device according to the preamble of the independent claim. Such a locking device essentially comprises a stator and a rotor, wherein the rotor is rotatably mounted in the stator. Furthermore, a locking element and a blocking element are provided, wherein the locking element is movable between a first position and a second position, and wherein a starting position and a release position can be assumed by the blocking element, wherein in the starting position the blocking element prevents a movement of the locking element into the second position and in the release position the blocking element enables a movement of the locking element into the second position. Furthermore, the disclosure relates to a closing device according to the claims equipped with a locking device. Closing devices are available in numerous designs, for example in the form of a closing cylinder for doors, gates or windows.

BACKGROUND

EP 1 904 702 B1 discloses a locking device with a locking disc as a blocking element. The locking disc is rotated by an electric actuator and can enable movement of a locking element. A spring-loaded rotary element is provided in the locking device that prevents rotation of a locking disc into an unlocking position when the key is not inserted and restores the starting position of the locking disc when the key is withdrawn by rotating the rotary element if this is not possible by the electrical actuator. The disadvantage is that rotation of the rotating element, e.g. by means of a key without locking authorisation, releases the rotation of the locking disc, such that the locking disc can be manipulated in such a way that a release position of the locking disc is reached.

SUMMARY

The disclosure therefore further develops a generic locking device in such a way that the locking device, in particular the blocking element, is provided with very good protection against manipulation.

This is achieved by the limitations set forth in the independent claim. Advantageous further developments of the device are indicated in the dependent device claims, the description and in the figures. Furthermore, the object is also achieved by a closing device according to the claims. Advantageous further developments of the closing device are indicated in the description and in the figures. Features and details described in connection with the locking device according to the disclosure also apply in connection with the closing device according to the disclosure and vice versa. In this case, the features mentioned in the description and in the claims may each be essential to the disclosure individually by themselves or in combination. With the locking device according to the disclosure, a locking effect of, for example, a door, a gate or a window or the like can be achieved.

According to the disclosure, a locking device with a stator and with a rotor, a locking element and a blocking element is provided. The rotor is rotatably mounted in the stator. The locking element is, in particular linearly movably, mounted in a first component and can be moved between the first position and the second position. In this case, a starting position and a release position can be assumed by the blocking element, wherein in the starting position the blocking element prevents a movement of the locking element into the second position and in the release position the blocking element enables a movement of the blocking element into the second position. To achieve the advantage provided by the disclosure, the locking device comprises a spring element, wherein the spring element interacts with the blocking element in such a way that when the blocking element moves from the starting position into the release position, the spring element is at least temporarily tensioned in such a way that the spring element pushes the blocking element back in the direction of the starting position.

The core idea of the disclosure is the use of a spring element for applying force to the blocking element, wherein the spring element exerts a lesser force on the blocking element in the starting position than in the release position and/or on the way to the release position. The term "lesser force" includes "no force".

An advantage of the locking device according to the disclosure is that in the event of mechanical manipulation, the spring element pushes the blocking element back into its starting position. This prevents the blocking element from reaching the release position without authorisation for the locking element.

It can be provided that the spring element acts directly on the blocking element.

The locking device, in particular the rotor, can be connected or connectable to a knob or a key in order to transmit a mechanical torque to the rotor.

The locking device may comprise a keyway to receive a key. Preferably, the blocking element and/or the spring element is arranged behind the keyway. "Behind" is to be understood from the perspective of the user who operates the locking device.

It is conceivable that a wall limits the keyway at the rear. "Rear" is to be understood from the perspective of the user who operates the locking device. In other words, the end of the keyway is limited by a wall. The blocking element, the spring element and/or the locking element are arranged behind the wall. The wall is thus arranged between the blocking element, the spring element and/or the locking element on the one hand and the keyway on the other. The wall protects the blocking element and/or the locking element from manipulation.

The blocking element is preferably pretensioned into the starting position in the release position. The release position can, for example, be a temporary position that pretensions the spring element more than in the starting position. In particular, the starting position can be considered as a monostable position or as one of bistable positions of the blocking element.

It is also advantageous that the spring element can be used to mechanically move the blocking element back to its starting position by means of the spring force of the spring element after the release position has been assumed.

The electromechanical locking device may comprise an electromechanical actuator. The actuator can in particular be designed as an electric motor.

Preferably, the actuator enables the blocking element to be moved, in particular rotated, from the starting position to the release position. The actuator can move the blocking element into the release position and/or tension the spring element such that the spring element moves the blocking element into the release position.

The actuator enables the locking element to be moved to the second position.

The actuator can enable a driver to move when the rotor rotates. For this purpose, a lock can be removed and/or a coupling can be adjusted.

Preferably, in the first position, the locking element prevents rotation of the rotor in the stator and in the second position, the locking element enables rotation of the rotor in the stator.

The movement of the locking element preferably corresponds to a lifting movement towards and away from the blocking element.

The movement of the blocking element is preferably a rotational movement in a rotational axis towards or away from which the movement of the locking element runs.

It can be provided that the blocking element is arranged on the output shaft of the actuator designed as an electric motor. Preferably, the actuator enables rotation of the blocking element from the starting position to the release position. Preferably, the actuator rotates the blocking element from the starting position to the release position. This allows for a very space-saving design.

Preferably, the blocking element comprises a cavity in which the locking element is arranged in the second position. In the first position, however, the locking element is outside the cavity. In the release position, the blocking element is arranged so that the cavity is opposite the locking element so that the locking element can move into the cavity. In the starting position, however, the cavity is arranged in such a way that the cavity points away from the locking element so that the locking element cannot move into the cavity.

Preferably, the blocking element can assume positions between the release position and the starting position in which the locking element cannot move into the cavity. Positions in which the locking element cannot move into the cavity are called blocking positions. The starting position can be considered as one of the blocking positions.

The blocking element can, for example, be disc-shaped.

The blocking element can be located in the rotor. The actuator can be arranged in the rotor. It may be that the locking element is arranged in the rotor in the second position.

The stator preferably comprises a locking element recess in which the locking element is arranged in the first position. The rotation of the rotor is prevented in particular by engagement of the locking element in the locking element recess in the first position of the locking element. In the second position, the locking element is outside the locking element recess.

Preferably, the blocking element is movable from the starting position in a first direction, in particular in a first direction of rotation, and in a second direction, in particular in a second direction of rotation. The spring element and the blocking element preferably interact in such a way that the spring element is at least temporarily tensioned both during a movement in the first direction and during a movement in the second direction. This makes mechanical manipulation more difficult.

The blocking element may comprise a pin for tensioning the spring element.

The spring element can be designed as a torsion spring.

The spring element can have a torsion leg and a contact leg angled away therefrom, wherein the contact leg can be pretensioned against a pin of the blocking element.

The position of the pin relative to the spring element can determine an increase in the spring tension, i.e. a characteristic curve of the spring element tension.

It can be provided that the pin has a non-circular outer contour, which influences an increase in the spring tension, i.e. the characteristic curve of the spring element tension. For example, the pin can be elliptical, kidney-shaped or cone-shaped.

Preferably, it is provided that the blocking element is rotatable in a first direction of rotation from the starting position to the release position by a first angle of rotation and the blocking element is rotatable in a second direction of rotation from the starting position to the release position by a second angle of rotation. The second angle of rotation is preferably smaller than the first angle of rotation.

It can be provided that the restoring force of the spring is temporarily stronger during a rotation in the second direction of rotation than at least during a rotation in the first direction of rotation. As a result, in the second direction of rotation, in which the release position could be reached more quickly by mechanical manipulation, manipulation is made more difficult by the sharply increasing spring tension.

Preferably, an increasing tension of the spring element results in a characteristic curve of the spring element tension the further the blocking element moves from the starting position. The characteristic curve can increase more sharply, in particular in the second direction of rotation.

Preferably, the locking device comprises the electromechanical actuator. The actuator can be designed to move, in particular to rotate, the blocking element in the direction of the release position against the force of the spring element. Preferably, the spring element is tensioned in such a way that the spring element can rotate the blocking element back to its original position. Consequently, the spring element is designed such that the blocking element is moved, in particular rotated, from the release position into a blocking position and then into the starting position. This allows the actuator to tension the spring element in such a way that a mechanical return to the starting position of the blocking element occurs.

The locking device may comprise a stop. Another advantage is that the blocking element rests against the stop in the release position. The spring element can press the blocking element against the stop. Additionally or alternatively, rebounding of the blocking element from the stop during movement to the release position can be prevented or reduced. The spring element thus stabilises the blocking element in its rotational position in the system against the stop.

Preferably, the stop is arranged behind the keyway. The wall is arranged between the stop and the keyway.

The blocking element can come into contact with a retaining cam of the blocking element at the stop at which the release position of the blocking element is reached. The spring element presses the blocking element with the retaining cam against the stop to maintain the release position.

An additional advantage of arranging a spring element in interaction with the blocking element, in particular pressing the blocking element against the stop in the release position, can be that the electromechanical actuator only has to be controlled in a simple manner, for example with only temporary current supply. This allows the blocking element to be rotated, and the spring element ensures that the desired release position of the blocking element is assumed and maintained, in particular that a corresponding rotational position of the blocking element is maintained. As soon as the spring element can bring, in particular rotate, or has brought, in particular rotated, the blocking element into the desired release position, the current supply to the electromechanical actuator can be stopped and the spring element ensures that the release position of the blocking element is maintained.

It is preferably provided that the stop is moved out of its position of the blocking element, preferably by a mechanical movement of a user, particularly preferably in operative connection with a key, such that the blocking element is moved back into the starting position.

It can be provided that when the retaining cam of the blocking element no longer rests against the stop, for example by the stop being retracted and the retaining cam being released from the stop and being able to rotate freely, the blocking element is moved from the release position into a blocking position, in particular into the starting position.

Preferably, it is provided that the actuator rotates the blocking element starting from the starting position under increasing tension of the spring element in the direction of the release position until over a dead centre, wherein after exceeding a dead centre, the spring element moves or contributes to moving the blocking element into the release position.

It can be provided that the spring force of the spring element passes through a dead centre when the blocking element is rotated from the starting position into the release position. Before the dead centre, the spring element pushes the blocking element into the starting position and after the dead centre, the spring element pushes the blocking element into the release position. This means that the blocking element can rest against the stop in the starting position as well as in the release position. The activation of the actuator is only absolutely necessary in order to rotate the blocking element from the first starting position over the dead centre. The spring element enables or supports further rotation. The actuator therefore only has to rotate the blocking element past the dead centre while the spring element is tensioned, wherein the final rotation of the blocking element into the release position is ultimately caused or contributed to by the spring element. This makes it possible to control the actuator less precisely.

A further advantage is achieved by the rotational movement of the blocking element from the starting position into the release position and from the release position back into the starting position of the blocking element in the same direction of rotation. The advantage is in particular a simple control of the electromechanical actuator, which can be designed as a motor and is always activated for rotation in the same direction of movement, in particular the same direction of rotation.

The locking device further comprises an extension element, wherein the extension element is movable between an insertion position and a withdrawal position.

The extension element assumes the insertion position, in particular when a key is inserted, and when the key is withdrawn again, the extension element is returned to the withdrawal position. Thus, the range of the key is extended by the extension element. Preferably, the extension element extends through the wall. Thus, the extension element can interact with the key on the one hand and with components protected by the wall, in particular the blocking element, on the other hand.

The extension element remains in the locking device after the key is removed.

The extension element is preferably designed to be moved in the axial direction between the withdrawal position and the insertion position, in particular to be displaced linearly. For example, the rotor may comprise a guide for the extension element.

If the extension element moves linearly, the extension element can alternatively be referred to as a slider.

The extension element and the blocking element can be designed such that the extension element in the insertion position prevents a movement of the blocking element from the release position into a blocking position, in particular into the starting position, wherein in particular the extension element blocks the blocking element from being moved from the release position into a blocking position by the force of the spring element.

For this purpose, the extension element preferably has the stop, while the blocking element comprises the retaining cam, which is held against the stop in the release position by the spring element.

Preferably, the extension element and the blocking element are designed such that the extension element in the withdrawal position enables a movement of the blocking element from the release position into a blocking position, in particular into the starting position. The extension element is preferably in the withdrawal position out of operative connection with the blocking element, such that movement of the blocking element from the release position to the blocking position occurs due to the force of the spring element.

In the insertion position, the retaining cam can come into contact with the stop, whereas in the withdrawal position of the extension element, the retaining cam can rotate freely such that the blocking element cannot be held by the stop and the blocking element cannot maintain the release position.

This ensures in particular that the release position of the blocking element can only be assumed when the extension element is arranged in the insertion position, in particular when a key is inserted.

The blocking element preferably rotates over a partial circle as part of a full rotation in one direction of rotation each time the actuator is activated, wherein the spring element only creates the exact alignment of the blocking element in the release position when the retaining cam hits the stop. If the stop is missing, in particular if the extension element is moved out of the movement space of the retaining cam, the force of the spring element causes the starting position to be assumed, which is achieved by the spring element as a stable position.

If, for example, the electromechanical actuator is activated during electrical manipulation without the key being inserted and the extension element with the stop is moved into the movement space in the retaining cam, the blocking element is set in rotation, but the starting position is always reached again, in which the blocking element cannot be moved out of the blocking position and the blocking starting position is maintained by the spring element under the influence of the blocking element.

The blocking element is preferably pressed against the extension element by the spring element with at least a force component perpendicular to the axial direction, while the extension element blocks a movement of the blocking element from the release position into a blocking position. In this position, the retaining cam of the blocking element is preferably in contact with the stop. This makes it possible that the insertion position can have an error tolerance.

In the insertion position, the extension element preferably blocks a movement of the blocking element from the starting position into the release position in at least one direction of rotation, in particular at least in the second direction of rotation. This provides additional protection against manipulation.

The extension element also moves a coupling part into an operative connection with a driver.

In particular, the coupling part can remain in operative connection with the driver when the extension element moves from the insertion position into the withdrawal position. Additionally or alternatively, the extension element can move the coupling part in the axial direction without a form fit.

The extension element can be designed and/or can interact with the coupling part in such a way that the extension element prevents a movement of a coupling part out of the operative connection with the driver in the insertion position and allows the operative connection of a coupling part to the driver to be released in the extended position.

Preferably, it is provided that a torque can be transmitted from the rotor to the coupling part without the extension element transmitting the torque. This makes it possible to design the extension element in a filigree manner and to save installation space.

The locking device may comprise an electronic control device, in particular a processor and/or a controller, to control the actuator. The control device may further comprise an electronic memory.

The locking device further comprises a transmission device for transmitting data and/or electrical energy from a key to the locking device.

The transmission device can be designed as a transmitting and receiving unit, as a biometric sensor, as a keypad for inputting a PIN and/or as a contact element for making electrical contact with an in particular electronic key. The transmitting and receiving unit can be designed to communicate with a mobile unit, in particular a mobile telephone or a card, by near-field communication, in particular RFID or Bluetooth Low Energy.

The transmission device can be used to send and/or receive electronic data making it possible to determine a user's authorisation to unlock the spatial area. For example, the transmission device can receive an authorisation code and/or an authorisation time window, which is verified by the control device. If the authorisation returns a positive result, the actuator can be controlled to enable movement of the blocking element. This allows the locking element to move into the second position.

Alternatively, the transmission device can transmit an opening command. Based on the opening command, the actuator can be controlled to enable movement of the blocking element. For example, based on the opening command, the locking element can be moved electromechanically into the second position or the movement into the second position can be released electromechanically.

The transmission device in particular additionally or alternatively transmits electrical energy to the locking device. The electrical energy can be provided for operating the actuator and/or the control device.

Preferably, the locking device is free of mechanical coding. This means that the locking authorisation is based exclusively on the electronic data that is sent and/or received from the locking device via the transmission device.

Preferably, when the key is removed, the transmission of data and/or electrical energy is interrupted. This means that the actuator cannot be activated. Because the transmission of electrical energy is interrupted, it is preferably provided that the blocking element is mechanically returned to its starting position by the spring element.

Additionally or alternatively, it can be provided that the extension element engages in the key in a form-fitting manner, such that when the key is withdrawn, the extension element always moves from the insertion position to the withdrawal position. This ensures that the extension element is moved from the insertion position to the withdrawal position each time the key is withdrawn. This ensures that the extension element releases the movement of the blocking element from the release position to a blocking position, in particular to the starting position, through the spring element.

The locking device is preferably used to lock a spatial area. In particular, the spatial area is fixed. For example, the spatial area may be a room in a building, such as an office, an apartment or a house, or a storage space, such as a cupboard, a postbox, a chest, a box, a safe or a drawer. In particular, the locking device is inserted into a particularly door-like locking element, for example a front door, an apartment door, a room door, a cupboard door, a mailbox flap or the front of a drawer, or to be attached to a closure element. Preferably, the stator of the locking device is at least indirectly connected to the closure element in a rotationally fixed manner.

The locking device may have a driver or be connectable to a driver. A rotation of the rotor of the locking device rotates the driver.

The driver is preferably designed as an eccentric. The driver can be designed as a locking lug. It may be that a rotation of the driver in a first direction transfers the closure element from an unlocked state to a locked state. It may also be the case that a rotation of the driver in a second direction transfers the closure element from a locked to an unlocked state. For example, the locking device can be inserted at least indirectly into a mortise lock. In this case, rotating the driver can cause the bolt of the mortise lock to move. For example, rotation of the driver in a first direction can cause the bolt to extend and thus bring about the locked state of the closure element. A rotation of the driver in a second direction can, for example, cause the bolt to retract and thus bring about the unlocked state of the closure element.

Alternatively, the driver itself can act as a bolt. For example, rotation of the driver in a first direction can cause the driver to assume a locking position. Rotating the driver in a second direction, for example, can cause the driver to assume an unlocking position.

In a preferred embodiment, the locking device is designed as an installation device. The installation device is designed to be inserted into a closing device housing of a closing device. Preferably, the installation device is fixed in the closing device housing in a rotationally fixed manner by means of a fastening element. Thus, when the closing device is assembled, the stator of the locking device and the closing device housing form a common fixed unit. The closing device housing is used in particular for insertion into or attachment to the closure element. The closing device can be designed, for example, as a closing cylinder, in particular as a double cylinder or half cylinder, as a knob cylinder, as a furniture cylinder or as a padlock.

If the locking device is designed as an installation device, it is preferably provided that the locking device comprises a connecting portion in order to be connected to a driver.

Alternatively, it can be provided that the locking device itself is designed as a closing cylinder, in particular as a double cylinder or half cylinder, as a knob cylinder, as a furniture cylinder or as a padlock. The stator also serves as a housing for insertion into or attachment to the closure element.

Alternatively, the locking device can be provided for a switching element. This means that the switching element can only be operated by authorised users. A driver of the switching element can be used to operate a switch or button. Thus, the locking device can be installed in a switching element, in particular in a key switch, or can correspond to a key switch.

In particular, it can be provided that when the blocking element is in the release position, the rotation of the rotor enables, in particular causes, a movement of the blocking element into the second position. In particular, a first contact surface of the stator pushes the locking element into the second position.

A second contact surface of the stator is designed in particular such that the locking element is spaced from the blocking element by the contact with the second contact surface. This can prevent damage to the locking device.

The blocking element and the locking element can be spaced apart from one another in the first position of the locking element, in particular when the locking element is not tensioned and/or when the locking element rests against the second contact surface.

In particular, because the second contact surface separates the locking element from the blocking element, it is possible to mount the blocking element on one side. This means that the output shaft can only be mounted on one side of the actuator.

In particular, in order to space apart the blocking element and the locking element when they rest against the second bearing surface, the locking element can comprise a projecting head surface. The second contact surface can be designed accordingly. The head surface and the second contact surface are designed such that when the locking element rests on the second contact surface, the second contact surface is located between the head surface and the blocking element.

Alternatively or additionally, the movement of the locking element between the first and the second position defines a direction of movement, wherein the head surface and the second contact surface are formed inclined to the direction of movement of the locking element. This allows forces acting on the locking element to be directed into the stator.

Preferably, the stator comprises a stator element that has the first contact surface and is movably mounted in the rest of the stator. In particular, this can ensure that the locking element comes into contact with the second contact surface as a result of a movement of the stator element. The stator element preferably has no fixed connection or bearing to the rotor.

It can be provided that the stator element and the locking element move relative to each other when the rotor rotates. In the release position of the blocking element, the locking element moves from the first position to the second position. In the blocking position of the blocking element, the stator element moves so that the locking element comes to rest on the second contact surface.

It can be provided that the stator element is movable between a first position and a second position. In the first position, the first contact surface rests against the locking element in such a way that when the rotor rotates, the locking element is moved from the first position to the second position. In the second position of the stator element, the locking element comes into contact with the second contact surface in such a way that the locking element remains in the first position. This means that the stator element must first be moved into the desired second position during the aforementioned rotation such that the second contact surface can become effective.

In the first position of the stator element, the first contact surface is closer to the locking element than the second contact surface. In the second position of the stator element, the second contact surface protrudes further into the locking element recess than the first contact surface.

The movement of the stator element between the first position and the second position preferably comprises a perpendicular component to the movement of the locking element between the first position and the second position. In particular, the movement of the stator element between the first and the second position occurs perpendicular to the movement of the locking element from the first position to the second position.

The stator may comprise at least a first spring that forces the stator element into the first position. This automatically returns the stator element to the first position, allowing for easier movement control. Preferably, the locking element is pretensioned into the first position by a second spring.

Preferably, the force acting on the locking element through the second spring is smaller than the force acting on the stator element through the first spring. It may be that the spring constant of the second spring is smaller than the spring constant of the first spring. This allows the first spring to keep the stator element in the first position when the locking element can move into the second position.

Preferably, the locking element is arranged between at least one first stator element and at least one second stator element. Thus, both when the rotor rotates clockwise and anti-clockwise, the locking element is moved into the second position by the first contact surface, provided that the blocking element allows movement into the second position.

Preferably, the locking element is arranged between two second contact surfaces. Thus, both when the rotor rotates clockwise and anti-clockwise, the locking element is moved against a second contact surface if a movement of the locking element into the second position is prevented in particular by the blocking element.

It can further be provided that the rotor comprises at least a first axial portion, in particular a first rotor element, and a second axial portion, in particular a second rotor element. The second portion has a smaller diameter than the first portion.

It can be provided that the locking element is arranged in the second axial portion. This provides sufficient space in the stator to accommodate the first and second contact surfaces. Preferably, sufficient space is provided in the stator to accommodate the stator element(s).

In particular, the locking device can comprise a locking element for locking in at least one position of the rotor relative to the stator. The locking element holds the rotor in a position in which the locking element is not forced from the first contact surface to the blocking element. This ensures that the locking element is held securely in this position and cannot leave this position unintentionally.

Furthermore, according to the disclosure, a closing device is provided, wherein the closing device is designed with a closing device housing and a locking device, as shown above, wherein the locking device is accommodated in the closing device housing.

BRIEF DESCRIPTION OF THE DRAWINGS

In the following, the disclosure will be explained further on the basis of an exemplary embodiment. Technical features with identical functions are provided here with identical reference numerals in the figures. In the figures.

DETAILED DESCRIPTION OF THE DRAWINGS

Figure 1:
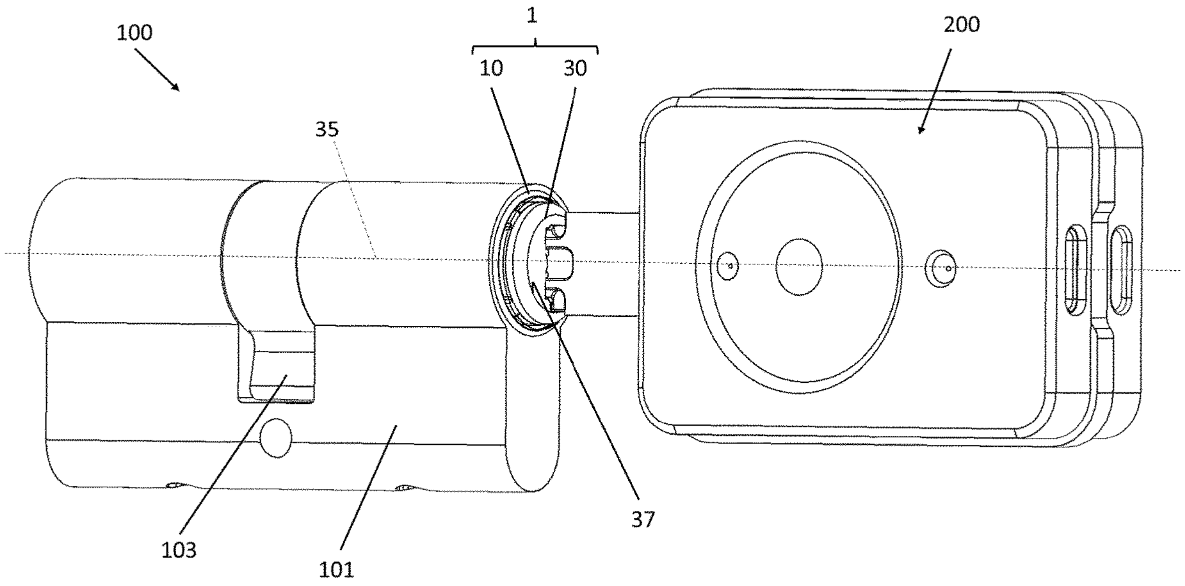
FIG. 1 shows a closing device according to the disclosure and a key.
Figure 2:
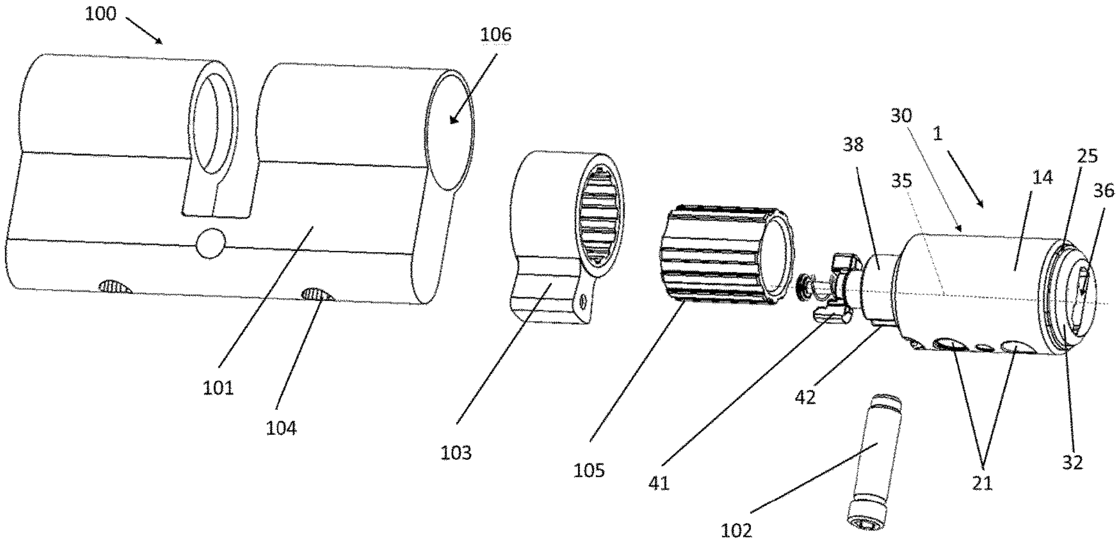
FIG. 2 shows the closing device from FIG. 1 in a partially disassembled state, with a perspective view of a locking device according to the disclosure, which is designed as an installation device.

FIG. 1 and FIG. 2 show a closing device 100 in the form of a closing cylinder, as is known to be used in mortise locks in order to unlock a building door as a closure element or to be able to lock it by means of a bolt. For this purpose, the closing device 100 has a housing 101 with a recess in which a driver 103, which is designed as a locking lug, is rotatably arranged. The driver 103 serves to move a bolt in the locking or unlocking direction.

In the right half of the housing 101, a locking device 1 designed as an installation device according to an embodiment of the disclosure is inserted. The installation device 1 comprises a stator 10 arranged on the outer circumference, in which a rotor 30 of the installation device 1 is inserted so as to be rotatable about a rotor axis 35, which, for example, corresponds to the axis of rotation of the driver 103. The rotor 30 comprises, on its front side 37 facing away from the driver 103, a keyway 36 for inserting a shaft of a key 200.

The key 200 carries an electronic locking secret in the form of electronic data. The locking secret can be used to determine a user's authorisation to unlock the door. The key 200 is preferably designed without mechanical coding. Therefore, only the electronic locking secret can be used to determine whether the user has authorisation or not. The keys and the locking devices can be identical in terms of their external shape and thus also mechanically. In addition, it is possible to make a keyway 36 as short as possible and thus increase the protection against manipulation.

The key 200 also comprises a battery to supply the locking device 1 with electrical energy.

FIG. 2 shows the closing device 100 in a partially disassembled state. The housing 101 has, for example in both halves of the recess for the driver 103 in the lower area, recesses 104, of which the right-hand recess is provided with a reference number. The recesses 104 shown here extend perpendicular to the axis of rotation of the driver 103. The driver 103 has, for example, an inner contour that is not circular in cross-section, for example in the form of an internal toothing, into which an insert 105 preferably engages in a form-fitting manner. For this purpose, the insert 105 has an outer contour that is complementary to the inner contour of the driver 103, here in the form of an external toothing, so that both parts 103, 105 are arranged in a rotationally fixed manner with respect to one another.

A connecting portion 38 of the installation device 1 projects into the insert 105. In the connecting portion 38, a coupling part 41 is slidably arranged in a guide 42. The coupling part 41 is designed in several parts and, depending on the position of the coupling part 41, can establish or release an operative connection between the rotor 30 and the driver 103, in particular via the insert 105. For this purpose, the coupling part 41 of the closing device 100 can engage in a form-fitting manner in an inner contour (not shown) of the insert 105. The guide 42 preferably forms a linear guide for the coupling part 41, so that the coupling part 41 is arranged to be guided and movable along the rotor axis 35 of the rotor 30.

The installation device 1 has a casing 14 with which the installation device 1 is inserted into an associated insertion opening 106 of the housing 101. A fastening element 102 in the form of a screw is screwed through the recess 104 on the right here from the underside of the housing 101 and into an opening 21 on the left here of the casing 14 of the stator 10 and of a stator body 11 of the stator 10, which will be explained in more detail later. The screw 102 thus fixes the stator 10 in the housing 101. Furthermore, the keyway 36 for inserting the key 200 is designated here, which is formed in a first rotor element 32 of the rotor 30.

Figure 3:
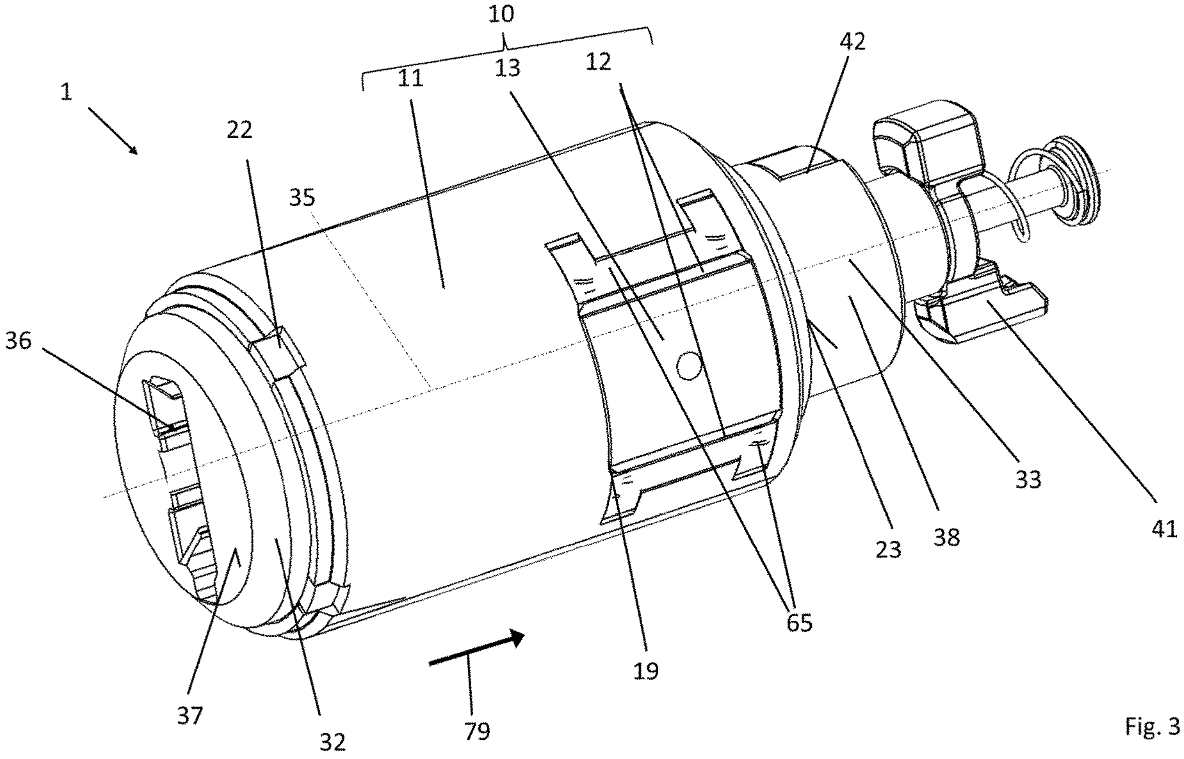
FIG. 3 shows the locking device according to the disclosure from FIG. 2 without a casing.

FIG. 3 shows the installation device 1 without the casing 14. The stator body 11 is also designed as a type of sleeve and has functional structures on the inside. The stator body 11 has a cavity 19 into which a stator insert element 13 is inserted. Stator elements 12, which will be explained in more detail later, are attached or arranged on a side of the stator insert element 13 facing the interior of the stator body 11. The stator elements 12 are movably mounted on the stator insert element 13 and the stator body 11. The stator elements 12 remain in the rest of the stator 10 when the rotor 30 rotates.

The rotor 30 comprises the first rotor element 32 and a second rotor element 33.

The rotor 30 is rotatable in the stator body 11 of the stator 10, but is fixed in the direction of its rotor axis 35, which runs parallel to the insertion direction of the key 200 into the keyway 36. The coupling part 41 is arranged in a rotationally fixed manner on the second rotor element 33 of the rotor 30 of the installation device 1. Both rotor elements 32, 33 are reversibly detachably attached to each other.

The second rotor element 33 has the guide 42 into which the coupling part 41 engages and is thus arranged in a rotationally fixed manner to the second rotor element 33. The second rotor element 33 is inserted into the stator body 11 from a base side 23 of the stator 10, preferably without the first rotor element 32 during assembly.

Figure 4:
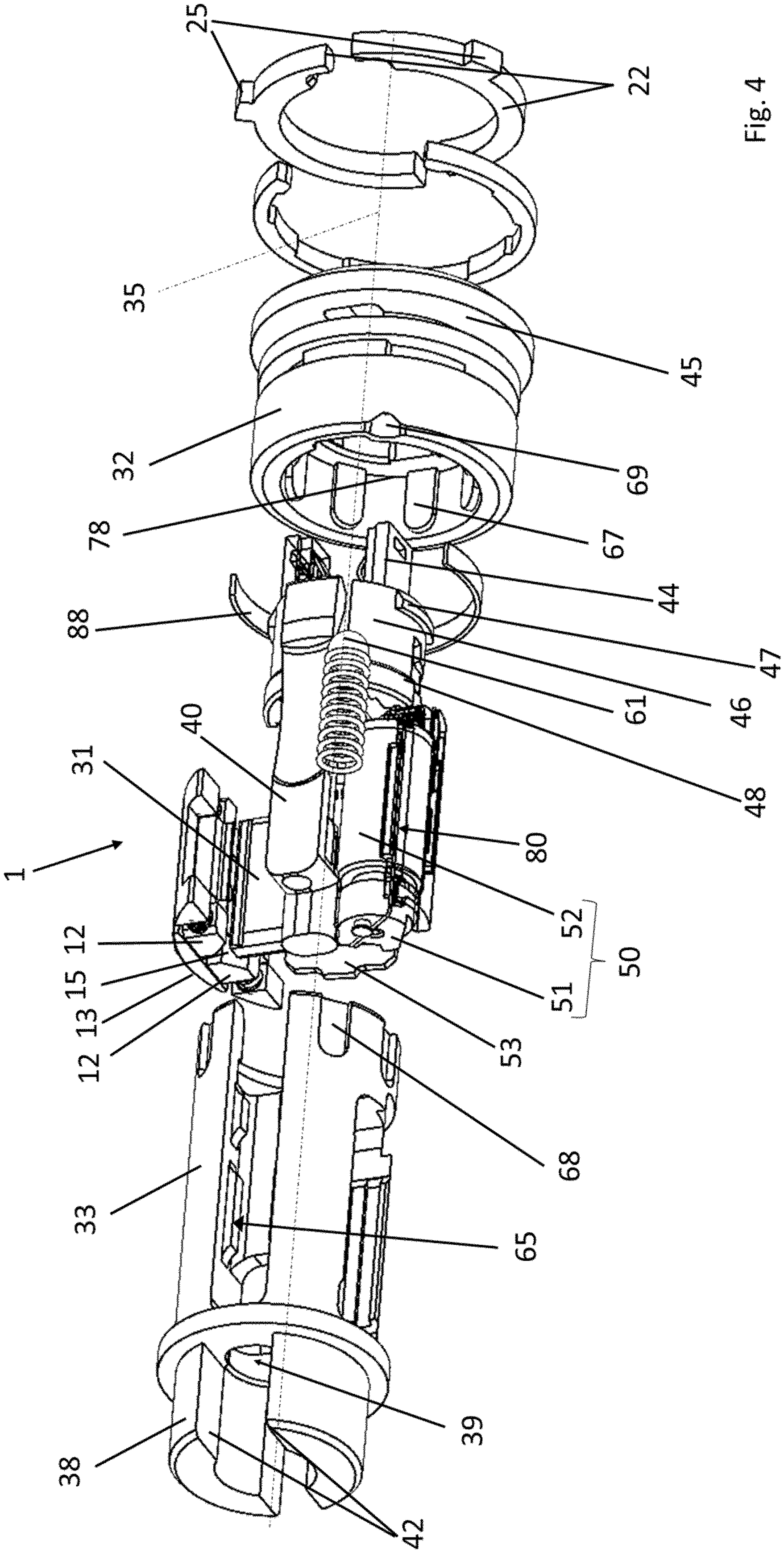
FIG. 4 shows the locking device from FIG. 3 without a casing or stator body in an exploded view showing the spring element according to the disclosure.

FIG. 4 shows the installation device 1 without the casing 14, stator body 11 or coupling part 41 in a partially disassembled state. An extension element 40 designed to interact mechanically with the key 200 is shown. If the key 200 is inserted into the keyway 36, it moves the extension element 40 axially or parallel to the rotor axis 35 in the direction of the second rotor element 33 upon contact. The extension part 40 moves the coupling part 41 away from the rotor 30 in the direction of the driver 103 so that the coupling part 41 can come into rotational engagement with the driver 103. A passage 39 is provided in the connecting portion 38 so that the extension element 40 comes to rest on the coupling part 41. Either the extension element 40 or the coupling part 41 can protrude through the passage 39.

A transmission element 44, here for example in the form of contact elements, is spring-mounted on a housing 46 in order to establish a data and/or energy transmission connection with the key 200. This makes it possible to read electronic data, for example authentication information or an opening command, from the key 200 or to receive it from the key 200. An electronic control device 53 is coupled to the transmission element 44 in order to read out the data and, if necessary, evaluate it. If the check of the control device 53 shows that the user of the key 200 is authorised to open the associated door and/or if the control device 53 has an opening command, an electromechanical actuator assembly 50 is activated.

The actuator assembly 50 comprises an electromechanical actuator 52, here in the form of an electric motor, on the output shaft of which a blocking element 51 is arranged in a rotationally fixed manner.

The locking device 1 according to the disclosure comprises a locking element 31, which is mounted in the rotor 30 so as to be linearly movable. The locking element 31 is preferably mounted so as to be movable perpendicular to the rotor axis 35 towards and away from the blocking element 51. In the first position shown here, the locking element 31 is located in a locking element recess 15 which is formed by the stator 10, in particular by the stator insert element 13 and the stator elements 12. This prevents the rotor 30 and thus the coupling part 41 from rotating. Turning the inserted key 200 to unlock the corresponding lock is thus prevented. In a second position of the locking element 31 (not shown), it comes out of engagement with the locking element recess 15 of the stator 10. This makes it possible to rotate the rotor 30 in the stator 10 and thus the driver 103 in order to actuate the closing device and to release the closing mechanism.

The blocking element 51 comprises a cavity 54. The blocking element 51 is rotatable between a release position (not shown) in which the cavity 54 is opposite the locking element 31 such that the locking element 31 can move into the cavity 54 and a blocking position in which the cavity 54 is not opposite the locking element 31 such that the locking element 31 is prevented from moving into the cavity 54.

The cavity 54 takes up only a small part of the peripheral surface of the blocking element 51, such that a predominant part of the positions that can be assumed by the blocking element 51 are blocking positions. The blocking position in which the blocking element 51 is located in the unactuated state of the locking device is referred to as the starting position.

The actuator assembly 50 with the electromechanical actuator 52 in the form of the electric motor and with the blocking element 51 on its output shaft has a spring element 80 according to the disclosure. The spring element 80 interacts with the blocking element 51 in such a way that when the blocking element 51 moves from the starting position into the release position, i.e. when the blocking element 51 is rotated, the spring element 80 is at least temporarily tensioned in such a way that the spring element 80 pushes the blocking element 51 back in the direction of the starting position, i.e. rotates it back into a certain rotational position. This provides protection against manipulation.

Figure 5:
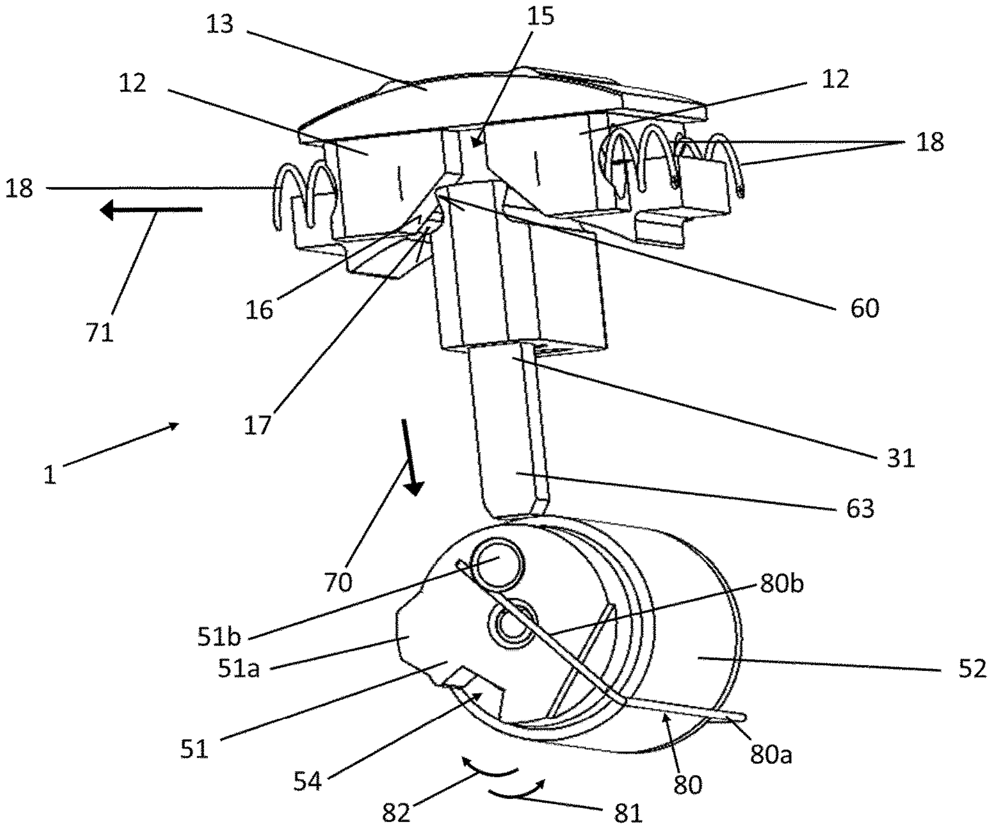
FIG. 5 shows selected elements of the locking device from FIG. 4 with the spring element according to the disclosure.

Starting from the starting position, the blocking element 51 can be movable in a first direction, in particular a first direction of rotation 81, and in a second direction, in particular in a second direction of rotation 82 (see FIG. 5). At least the second direction of rotation 82 is conceivable by mechanical manipulation. The spring element 80 and the blocking element 51 interact in such a way that the spring element 80 is at least temporarily tensioned both during a movement in the first direction 81 and during a movement in the second direction 82. Thus, with every mechanical manipulation attempt, the blocking element 51 is pushed back to its starting position.

The spring element 80 is designed as a torsion spring. With reference to FIG. 5, the spring element 80 according to the disclosure is shown, which encompasses the blocking element 51 and the electromechanical actuator 52. The spring element 80 is rigidly clamped on the rear side with its end portion there, and the spring element 80 has a torsion leg **80*a* that merges into a contact leg 80*b* angled approximately 90° therefrom and is pretensioned against a pin 51*b* of the blocking element 51. In this embodiment, the pin 51*b*** is round, but deviations from this are possible.

The pretensioning of the contact leg **80*b* against the pin 51*b* is effected via the torsion of the torsion leg 80*a* such that the blocking element 51 is rotationally pretensioned into the starting position shown here, in which the blocking element 51 prevents movement of the locking element 31 and the rotor 30 is not rotatable in the stator 10. In this position, the cavity 54 is not aligned with the locking element 31. The torsion leg 80*a* is rigidly attached to a cover 52*a* of the actuator 52 (see FIG. 7**).

In the starting position, the spring element 80 is not tensioned. Rather, in the first direction of rotation 81, as well as in the second direction of rotation 82, the blocking element 51 with the pin **51*b* must first be moved before the spring element 80** is tensioned.

In the first direction of rotation 81, the blocking element must rotate by more than 180° to reach the release position from the starting position, while in the second direction of rotation 82, a rotation of less than 180° is sufficient to get from the starting position into the release position. However, a manipulative rotation in the second direction of rotation 82 is made more difficult by a steeper increase in the spring tension than in the first direction of rotation 81.

Figure 9:
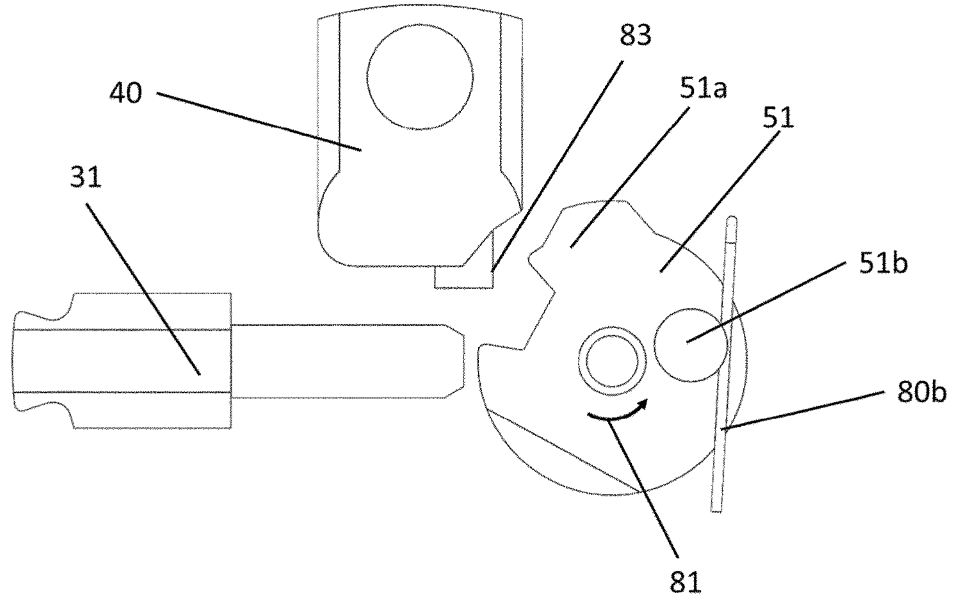
FIG. 9 shows selected elements of the locking device according to the disclosure of FIGS. 1 to 8, wherein the position of the blocking element has been changed

If the electromechanical actuator 52 is energised, the blocking element 51 is rotated anti-clockwise according to the arrow 81 in the view shown here, such that this rotation increases the pretension in the torsion leg **80*a* of the spring element 80 up to a dead centre. At the dead centre, the spring element 80 presses the pin 51*b* in the direction of the output shaft. After passing through the dead centre, the spring tension of the spring element 80 is reduced again. As a result, once the dead centre has been passed, the blocking element 51 is pushed into the release position by the spring tension of the spring element 80. Thus, the spring element 80 can move or contribute to moving the blocking element 51 into the release position. FIG. 9 shows a blocking position of the blocking element shortly after passing the dead centre and shortly before reaching the release position. As a result, it is not necessary to switch off the actuator 52** precisely in order to reach the release position.

By rotating the blocking element 51 into the release position, the cavity 54 can be rotated into the corresponding position with the locking element 31. In order to lock the position of the cavity 54 corresponding to the locking element 31, i.e. in the release position, a stop 83 is provided, which is explained in more detail in connection with FIG. 7 and against which a retaining cam 51*a* of the blocking element 51 can come to rest.

In the release position, the blocking element with the retaining cam 51*a* is pressed against the stop 83 by the spring element 80, so that the release position is precisely defined to a particular extent. In addition, a rebound of the retaining cam 51*a* from the stop 83 towards the end of the rotation in the direction of rotation 81 is reduced or prevented.

If the stop 83 is moved away from the effective range of the retaining cam 51*a*, as described in connection with FIGS. 7 and 8, the blocking element 51 is moved back to the starting position by the force of the spring element 80. The direction of rotation 81 is maintained. As a result, the blocking element 51 is always moved in only one direction of rotation when used as intended, in this example in the direction of rotation 81.

When the key 200 is withdrawn, the contact with the transmission element 44 is broken. As a result, it is not possible to enable the blocking element 51 to move back from the release position to the starting position by means of the actuator 52 using the electrical energy of the key 200. This is also not necessary in the locking device 1 according to the disclosure. Rather, the spring element 80 takes over the return of the blocking element 51 from the release position to the starting position by the mechanical tension of the spring element 80.

The retaining cam 51*a* and/or the pin 51*b* are rigid, preferably integral, particularly preferably monolithic with the remaining blocking element 51.

Figure 6:
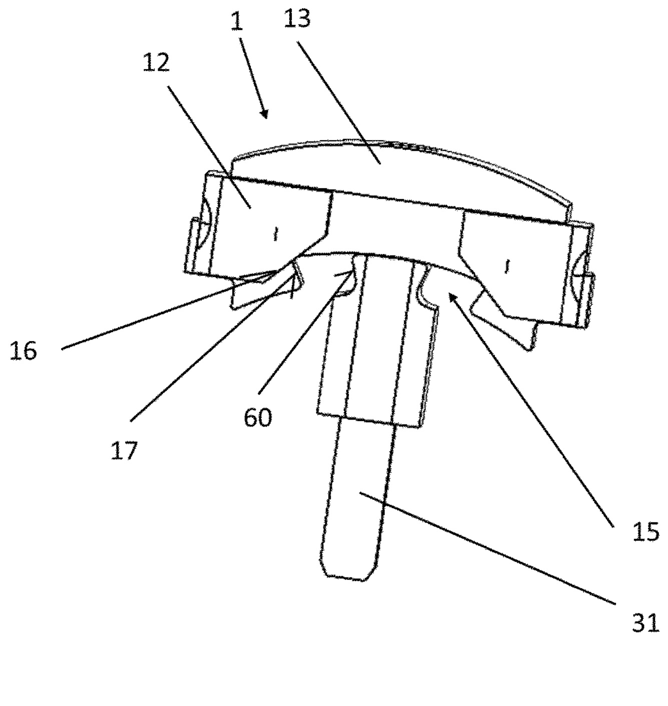
FIG. 6 shows selected elements of the locking device from FIG. 4 in a side view.

FIGS. 5 and 6 show selected elements of the locking device 1 from FIG. 4. FIG. 5 shows the arrangement of the locking element 31 in relation to the blocking element 51 and the stator insert element 13 together with stator elements 12. FIGS. 4 and 5 show blocking positions of the blocking element 51.

The locking element 31 is designed at its contact portion 63 facing the blocking element 51 to be able to move into the cavity 54 when the blocking element 51 is in the release position and the cavity 54 is opposite the contact portion 63 of the locking element 31, i.e. points upwards in FIG. 5. This makes it possible for the locking element 31 to move into the second position.

A first contact surface 16 of the stator elements 12 facing the locking element 31 is designed to force the locking element 31 towards the blocking element 51 as the rotor 30 continues to rotate, i.e. into the second position in which the rotor 30 is freely rotatable relative to the stator 10. The first contact surface 16 is designed as an inclined surface that forces the locking element 31 into the second position.

The stator elements 12 are movably mounted on the stator insert element 13 between a first position and a second position. The stator elements 12 are forced into the first position by means of first springs 18. The first springs 18 are mounted in the stator 10. The movement of the stator elements 12 from the first position to the second position according to the direction of movement 71 is perpendicular to the direction of movement 70 of the locking element 31.

During a process for unlocking the rotor 30 relative to the stator 10, the locking element 31 is initially located in the locking element recess 15. The locking element 31 is guided in the rotor 30. In addition, the locking element 31 rests on the first contact surfaces 16 of the stator elements 12. This centres the locking element 31. This position of the locking element 31 is referred to as the rest position. In the rest position, the locking element 31 is preferably arranged at a distance from the blocking element 51.

A user now wants to unlock the door and inserts the key 200 into the keyway 36. This starts an electronic communication between the key and the control device 53, which electronically determines whether the user is authorised.

If the user is authorised to unlock the door, the control device 53 controls the actuator 52. The actuator 52, designed as an electric motor, rotates the blocking element 51 into the release position in which the cavity 54 is opposite the locking element 31. If the rotor 30 is now set in rotation by means of the key 200, the locking element 31 slides along one of the first contact surfaces 16 into the second position in which the locking element 31 engages in the cavity 54, wherein the locking element 31 is preloaded into the locking element recess 15 by second springs (not shown). The locking element 31 then moves in the direction of movement 70 due to the rotation of the rotor 30.

The stator elements 12 remain in the first position. This is made possible by the fact that the first springs 18 exert a higher force on the stator element 12, along which the locking element 31 slides, than the second springs (not shown), which force the locking element 31 upwards into the locking element recess 15.

The rotor 30 can now rotate freely. The locking element 31 slides along that of the first contact surfaces 16 into which the locking element 31 is rotated. The locking element 31 is surrounded by the first contact surfaces 16 in both directions of rotation, such that rotation in both directions when it rests on one of the first contact surfaces 16 causes the locking element 31 to move into the second position. In order to provide first contact surfaces 16 in both directions of rotation, the locking element recess 15 is surrounded on both sides by stator elements 12.

As shown in FIG. 6, the stator 10 has second contact surfaces 17, which leave the locking element 31 in the first position. The second contact surfaces 17 are used functionally when the user is not authorised to unlock the door. The second contact surfaces are formed in or on the stator insert element 13. If the locking element 31 is in the rest position, the second contact surfaces 17 are further away from the locking element 31 than the first contact surfaces 16.

Preferably, the second contact surfaces 17 are also inclined, but opposite to the first contact surfaces 16 with respect to the direction of movement 70 of the locking element 31. The second contact surfaces 17 thus form an obtuse angle to the direction of movement 70 of the locking element 31.

At its end facing the stator insert element 13, the locking element 31, viewed along the axis of rotation of the blocking element 51 and/or the rotor axis 35, has a cross-section having the shape of a symmetrical trapezoid tapering in the direction of the blocking element 51. The legs of this trapezoid form head surfaces 60 on the outside in relation to the locking element 31. The head surface 60 and the corresponding contact surface 17 are inclined to the direction of movement of the locking element 31.

If the user is not authorised to unlock the door, the following procedure occurs. The locking element 31 is initially in the rest position. A key 200 without locking authorisation is inserted into the keyway 36. The electronic data exchange shows that there is no authorisation to unlock the door. Therefore, the actuator 52 is not activated and the blocking element 51 remains in a blocking position in which the cavity 54 is not opposite the locking element 31, as shown in FIGS. 4 and 5, in particular in the starting position.

Rather, an outer circumference of the blocking element 51 is opposite the locking element 31.

If the rotor 30 is rotated, the locking element 31 tries to slide along the first contact surface 16. However, this is not possible because the locking element 31 rests on an outer circumference of the blocking element 31. Thus, the locking element 31 cannot be pushed into the second position against the force of the second springs (not shown).

Instead, the stator element 12, which is located in the direction of rotation of the locking element 31, is pushed back by the locking element 31 against the force of the first spring 18 until the locking element 31 rests against the second contact surface 17. The stator element 12 is now in the second position. In this case, the head surface 60 of the locking element 31 comes into contact with the corresponding second contact surface 17 opposite one of the legs of the trapezoid. If an attempt is made to turn the rotor 30 with force using the key 200, the arrangement shown does not generate a higher force from the locking element 31 on the blocking element 51.

The contact surface 17 is designed such that the contact surface 17 holds the locking element 31 in the first position. Thus, the rotor 30 remains blocked by the locking element 31, such that the door cannot be unlocked.

Each of the contact surfaces 17 corresponds to a respective side of the facing head surface 60 of the locking element 31. The surface 60 and the corresponding contact surface 17 are designed such that the contact surface 17 is located between the surface 60 and the blocking element 51 when the locking element 31 rests against the contact surface 17.

If an attempt is made to rotate the rotor 30 further, the locking element 31 slides away from the blocking element 51 against the direction of movement 70. This is achieved by the inclination of the second contact surface 17. The locking element 31 can slide with the head surface 60 along the second contact surface 17. Thus, the locking element 31 and the blocking element 51 can be spaced apart from each other when they rest on the second contact surface 17. Additionally or alternatively, the forces acting on the locking element 31 during a further attempted rotation of the rotor 30 are diverted into the second contact surface 17. This is helped by the fact that the head surfaces 60 correspond to the second contact surfaces and thus the locking element 31 lies flat against the second contact surface.

This prevents damage to the blocking element 51, and it does not absorb the forces that arise when an attempt is made to forcibly rotate the rotor 30 in the stator 10. In particular, this makes it possible to make the blocking element 51 filigree and, for example, to mount it only on one side or to accommodate it on a thin shaft of the electromechanical actuator 52 designed as a motor.

The locking element recess is provided with the reference number 15. FIG. 6 shows the arrangement of FIG. 5 seen from one end of the locking element 31, only without the blocking element 51. Here, the stator elements 12 are in the second position. The same reference numerals in FIG. 6 are deemed to be described in FIG. 6 due to the description of FIG. 5.

Figure 7:
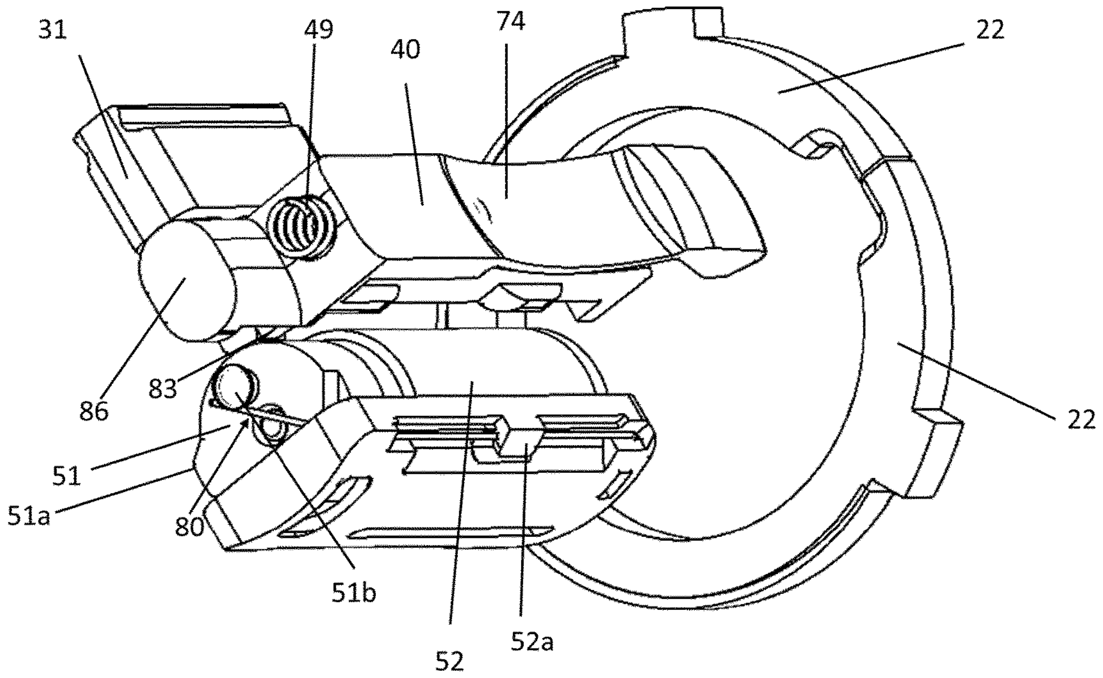
FIG. 7 shows a further illustration with the blocking element in connection with the spring element and with the extension element in an adjacent arrangement to the blocking element; the selected elements belong to the locking device according to the disclosure of the preceding figures.
Figure 8:
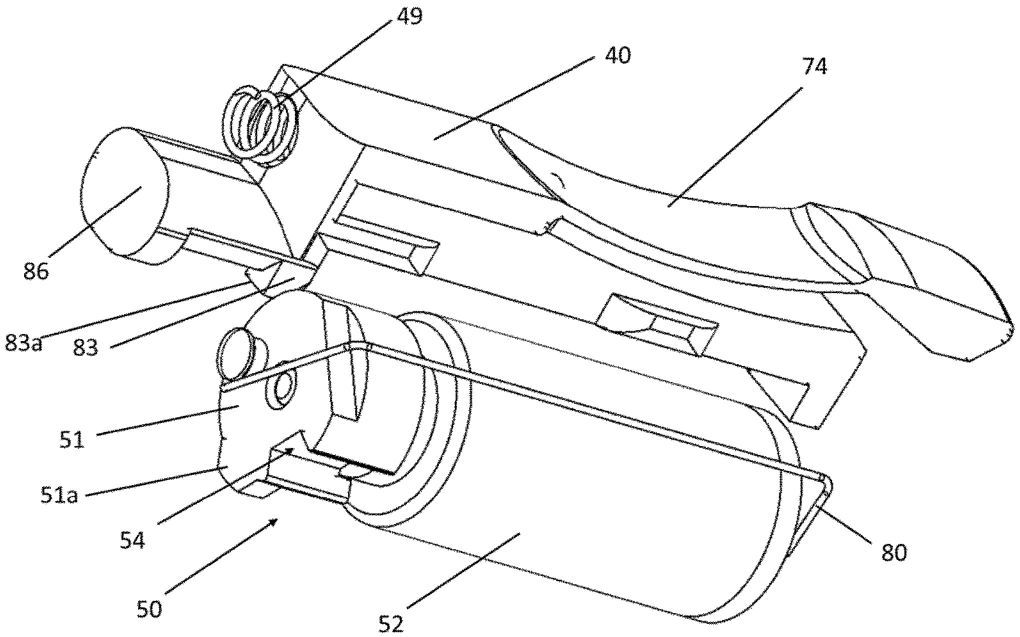
FIG. 8 shows a detailed view of the actuator assembly and the extension element from FIG. 7.

FIGS. 7 and 8 show selected components such as the extension element 40, the electromagnetic actuator assembly 50 with the electromagnetic actuator 52 and with the blocking element 51 which can be rotated by the latter.

The extension element 40 is movable linearly parallel to the rotor axis 35, i.e. in and against the direction of the arrow 79 (see FIG. 10), between an insertion position that the extension element 40 assumes when the key 200 is inserted, and a withdrawal position that the extension element assumes when the key 200 is withdrawn. The extension element 40 is forced into the withdrawal position of the key 200 by means of a spring 49. The extension element 40 is guided in a guide 65 of the rotor 30 (see FIG. 4).

The extension element 40 can bridge the distance between the key 200 and the coupling part 41.

In FIG. 7, the locking element 31 is shown at the side of the extension element 40. On the rear side, the extension element 40 has a portion 86 for pushing the coupling part 41, to which the stop 83 is attached on the underside.

The extension element 40 is angled in the example shown. In this case, a first part of the extension element 40, which is intended for interaction with the key 200, extends radially further outward than a second portion 86 of the extension element 40, which is intended for interaction with the coupling part 41. This allows the portion 86 to be arranged more centrally in order to be able to push the coupling part 41 better.

The extension element 40 is designed to push the coupling part 41, but without being in engagement in a form-fitting manner with the coupling part 41. This allows the extension element to be designed in a filigree manner.

If the extension element 40 is brought into the withdrawal position, the coupling part 41 remains in connection with the driver 103 due to the lack of a form-fitting connection. In the withdrawal position, however, the extension element 40 allows the coupling part 41 to come out of the operative connection with the driver 103, e.g. by a movement of the coupling part 41 from the other side of the door. In the insertion position, however, the extension element 40 blocks the movement of the coupling part 41 from the operative connection with the driver 103.

The extension element 40 mechanically holds the blocking element 51 in the release position. If the extension element 40 is in the insertion position, the stop 83 of the extension element 40 lies in the rotation path of the retaining cam 51*a*. Thus, the blocking element 51 with the retaining cam 51*a* rests against the stop 83 of the extension element 40 in the release position.

Here, the retaining cam 51*a* presses perpendicular to the direction of movement of the extension element 40. As a result of this and the axial spatial extension of the stop 83 and the retaining cam 51*a*, a certain error tolerance is possible with regard to the position of the insertion position of the extension element.

The extension element 40 mechanically returns the blocking element 51 from the release position to the starting position. The extension element 40 can be moved back into the withdrawal position when the key is withdrawn. When the extension element moves into the withdrawal position, a movement of the blocking element 51 into the blocking position can be caused or permitted. This is made possible by the fact that the stop 83 of the extension element 40 in the withdrawal position lies outside the rotation path of the retaining cam 51*a*. Thus, the stop 83 can no longer prevent a movement of the blocking element 51 by the pretensioned spring element 80 into the starting position. Rather, the stop 83 is located further forwards with respect to the rotor axis 35. In other words, in the withdrawal position of the extension element 40, the retaining cam 51*a* is located between the stop 83 and the connecting portion 38 in the axial direction. In the withdrawal position of the extension element 40, the stop 83 is located between the front face 37 and the retaining cam 51*a* in the axial direction. FIGS. 7 and 8 show the withdrawal position.

In the insertion position of the extension element 80, however, the stop 83 and the retaining cam 51*a* are axially equidistant from the connecting portion 38 and/or the side face 37.

In the insertion position, the extension element 40, in particular the stop 83, prevents the blocking element 51 from reaching the release position in the second direction of rotation. Rather, before reaching the release position, the retaining cam 51*a* would hit an area 83*a* (below in FIG. 8) of the stop 83. The first direction of rotation, on the other hand, is particularly protected against manipulation due to the longer angle of rotation range required to reach the release position. In the withdrawal position, however, the coupling part 41 is not engaged or would move out of operative connection with the driver 103 when the rotor 30 rotates.

When the key is inserted, the extension element 40 holds the blocking element 51 in the release position and allows the blocking element 51 to move back to the starting position when the extension element 40 with the key 200 moves in the direction of the front side 37 when the key is withdrawn.

When the electromechanical actuator 52 is activated, the blocking element 51 is rotated anti-clockwise in the view shown here, such that this rotation, under pretension of the spring element 80, moves the retaining cam 51*a* to rest against the stop 83 of the extension element 40. By this rotation of the blocking element 51, the cavity 54 can be rotated into the corresponding position with the locking element 31.

If the key 200 is withdrawn again, the stop 83 moves out of the range of movement of the retaining cam 51*a*, and the blocking element 51 rotates back into the starting position by the spring element 80, in which the locking element is pressed back into the locking element recess 15 by the second springs and the locking device 1 is locked again.

If the key 200 is inserted again and the extension element 40 is pushed back into the insertion position, the stop 83 moves back into the range of motion of the retaining cam 51*a*, and when the electromechanical actuator 52 is activated again, the retaining cam 51*a* again comes to rest against the stop 83. The blocking element 51 can always be rotated by the electromechanical actuator 52 in the same direction of rotation and always over the same angle of rotation until the spring element 80 rotates the blocking element 51 over the last angle portion into the release position. If the key 200 is withdrawn, the electromechanical actuator 52 does not have to be activated again because the spring element 80 causes the blocking element 51 to be rotated back to the starting position.

An engagement element 74 of the extension element 40 serves to engage with a key 200. This ensures that the key 200 pulls the extension element 40 along when the key is removed.

An annular projection 22 is shown consisting of two, in particular, half-shell-like parts, the inner surfaces 26 of which facing each other interact with the key 200 in the manner of a bayonet lock. The parts are inserted into a circumferential groove 45 of the first rotor element 32 (see FIG. 4). Outwardly projecting projections 25 of the annular projection 22 fix the parts of the projection 22 in the stator body 11 in their relative position to each other and to the stator body 11. The annular projection 22 interacts with the inserted key 200, preferably in a bayonet-like manner, as a key withdrawal lock. The projection 22 prevents the key 200 from being pressed by the spring 49 of the locking device 1 when the key 200 is inserted, such that the extension element 40 prematurely reaches the withdrawal position and thus the blocking element 51 reaches the blocking position or at least pushes the blocking element 31 out of the second position.

A locking element 61 is provided that holds the rotor 30 in position with respect to the stator 10 by engaging in a notch 69 (see FIG. 4). In this case, rotation of the rotor 30 is inhibited by the locking element 61 in the stator such that the locking element 31 can assume the rest position.

Figure 10:
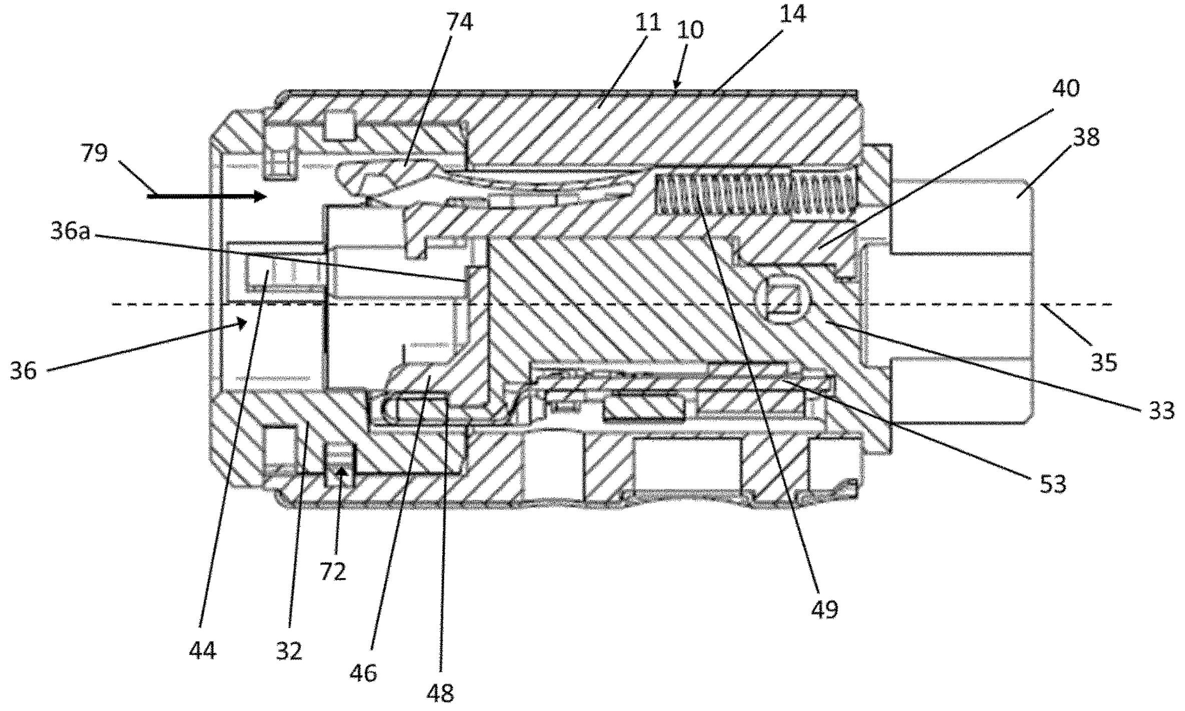
FIG. 10 shows a sectional view through the locking device showing the extension element according to the disclosure.

As shown in FIG. 10, the keyway 36 ends with a wall 36*a*. As shown in FIG. 10, only a portion of the extension element 40, which is designed to interact with the key 200, projects into the keyway 36. The wall 36*a* is essentially closed except for a portion that is necessary for the extension element 40 to protrude into the keyway. Because the extension element 40 is designed to be filigree, at least with the part of the extension element 40 that projects into the keyway 36, the wall 36*a* can close off the keyway 36 and protect the components located behind it, namely the locking element 31, the blocking element 51, the spring element 80, the actuator 52 and the control device 53. The keyway 36 can be made correspondingly short.

The contact elements 44 are spring-mounted on a housing 46.

The housing 46 also axially fastens the rotor elements 32, 33 to one another. For this purpose, the housing 46 comprises a first locking element 47 that locks into the first rotor element 32. For this purpose, the first rotor element 32 comprises an edge 78. The housing 46 comprises a second locking element 48 that locks into the second rotor element 33. For this purpose, the second rotor element 33 comprises a groove (not shown).

The housing 46 provides the wall 36*a.*

The installation device 1 can also be used in other closing devices, for example in a half cylinder, a knob cylinder, a furniture cylinder or a padlock.

It is conceivable that the coupling part 41 is missing. Rather, closing devices according to the disclosure can be provided in which the driver 103 is rigidly attached to the rotor 30. The driver 103 can also serve as a bolt itself, e.g. in a furniture lock. If the coupling part 41 is missing, the extension element 40 continues to hold the blocking element 51 against the spring force of the spring element 80 in the release position.

The driver 103 and the insert 105 can be formed integrally with each other.

The stator insert element 13 and the stator body 11 can be formed as one piece. It is also conceivable that the casing 14 is missing and the stator body is fastened directly in the closing device housing 101.

In a further alternative of the disclosure, the locking device 1 is not designed as an installation device 1. Rather, the stator 10 is designed as a closing device housing 101. Thus, the rotor 30 can be designed to be inserted directly into a closing cylinder housing 101. The closing device housing 101 then takes over the function of the stator 10.

The locking element 31 and/or the actuator assembly can also be mounted in the stator 10 such that the locking element 31 is pressed against the rotor 30.

The transmission device 44 can, for example, be designed as a contactless coil.

The rotor 30 does not have to have a plurality of rotor elements 32, 33. Nevertheless, the rotor can have 30 portions with different diameters.

The design of the disclosure is not restricted to the preferred exemplary embodiment indicated above. In fact, a number of variants is conceivable which make use of the represented solution even in the case of fundamentally different designs. All features and/or advantages emerging from the claims, the description or the drawings, including constructive details or spatial arrangements, may be essential to the disclosure by themselves and in the most varied combinations.

The invention claimed is:

1. An electromechanical locking device for a closure element or for a switching element comprising:
   - a stator,
   - a rotor,
   - a locking element and a blocking element,
   - wherein the rotor is mounted in the stator,
   - wherein the locking element is movable between a first position and a second position,
   - wherein a starting position and a release position is assumed by the blocking element, wherein in the starting position the blocking element prevents a movement of the locking element into the second position and in the release position the blocking element enables a movement of the locking element into the second position,
   - wherein the locking device comprises a spring element, wherein the spring element interacts with the blocking element in such a way that when the blocking element moves from the starting position into the release position, the spring element is at least temporarily tensioned in such a way that the spring element pushes the blocking element back in the direction of the starting position,
     - wherein the locking device comprises an electro-mechanical actuator, wherein the actuator is designed to move the blocking element in the direction of the release position against the force of the spring element, wherein in the first position, the locking element prevents rotation of the rotor in the stator and in the second, position, the locking element enables rotation of the rotor in the stator,
     - wherein the stator comprises a locking element recess in which the locking element is arranged in the first position, and the locking element is outside the locking element recess in the second position,
     - wherein the blocking element rests against a stop of the locking device in the release position, wherein the spring element presses the blocking element against the stop and/or prevents or reduces a rebound of the blocking element from the stop during the movement into the release position.

2. The locking device according to claim 1, wherein the blocking element is movable from the starting position in a first direction of rotation, and in a second direction of rotation, wherein the spring element and the blocking element interact such that the spring element is at least temporarily tensioned both during a movement in the first direction and during a movement in the second direction.

3. The locking device according to claim 1, wherein the spring element is tensioned such that the spring element rotates the blocking element back into the starting position.

4. The locking device according to claim 1, wherein the locking device comprises an extension element, wherein the extension element is movable between an insertion position and a withdrawal position, wherein the extension element and the blocking element are designed such that the extension element in the withdrawal position releases a movement of the blocking element from the release position into a blocking position, wherein the extension element is in the withdrawal position out of operative connection with the blocking element, such that a movement of the blocking element from the release position into a blocking position takes place by the force of the spring element.

5. The locking device according to claim 1, wherein the movement from the starting position into the release position and from the release position into the starting position takes place in the same direction of rotation, in the first direction of rotation.

6. The locking device according to claim 1, wherein the locking element comprises an extension element, wherein the extension element is movable between an insertion position and a withdrawal position, wherein the extension element serves to move a coupling part into an operative connection with a driver, wherein the coupling part remains in the operative connection with the driver during a movement of the extension element from the insertion position into the withdrawal position.

7. The locking device according to claim 1, wherein the locking element comprises an extension element, wherein the extension element is movable between an insertion position and a withdrawal position, wherein the extension element is designed to be moved, in the axial direction between the withdrawal position and the insertion position, wherein the blocking element is pressed against the extension element by the spring element with at least a force component perpendicular to the axial direction, while the extension element blocks a movement of the blocking element from the release position to a blocking position.

8. The locking device according to claim 1, wherein an extension element in an insertion position blocks a movement of the blocking element from the starting position into the release position in one direction of rotation, the second direction of rotation.

9. The locking device according to claim 1, wherein an extension element in an insertion position prevents a movement of a coupling part out of the operative connection with the driver and/or an extension element in the extended position allows a release of the operative connection of a coupling part to the driver.

10. The locking device according to claim 1, wherein the locking device comprises a transmission device for transmitting data and/or electrical energy from a key to the locking device, wherein when the key is withdrawn, the transmission of data and/or electrical energy is interrupted and/or an extension element engages in the key in a form-fitting manner, such that when the key is withdrawn, the extension element always moves from the insertion position to the withdrawn position.

11. A closing device with a closing device housing and a locking device according to claim 1, wherein the locking device is accommodated in the closing device housing.

12. An electromechanical locking device for a closure element or for a switching element comprising:
   - a stator,
   - a rotor,
   - a locking element and a blocking element,
   - wherein the rotor is mounted in the stator,
   - wherein the locking element is movable between a first position and a second position,
   - wherein a starting position and a release position is assumed by the blocking element, wherein in the starting position the blocking element prevents a movement of the locking element into the second position and in the release position the blocking element enables a movement of the locking element into the second position,
   - wherein the locking device comprises a spring element, wherein the spring element interacts with the blocking element in such a way that when the blocking element moves from the starting position into the release position, the spring element is at least temporarily tensioned in such a way that the spring element pushes the blocking element back in the direction of the starting position, wherein the locking device comprises an electro-mechanical actuator, wherein the actuator is designed to move the blocking element in the direction of the release position against the force of the spring element, wherein in the first position, the locking element prevents rotation of the rotor in the stator and in the second, position, the locking element enables rotation of the rotor in the stator, wherein the stator comprises a locking element recess in which the locking element is arranged in the first position, and the locking element is outside the locking element recess in the second position, wherein the spring element is designed as a torsion spring, wherein the spring element has a torsion leg and a contact leg angled therefrom, wherein the contact leg is pretensioned against a pin of the blocking element.

13. An electromechanical locking device for a closure element or for a switching element comprising:

a stator, a rotor, a locking element and a blocking element, wherein the rotor is mounted in the stator, wherein the locking element is movable between a first position and a second position, wherein a starting position and a release position is assumed by the blocking element, wherein in the starting position the blocking element prevents a movement of the locking element into the second position and in the release position the blocking element enables a movement of the locking element into the second position, wherein the locking device comprises a spring element, wherein the spring element interacts with the blocking element in such a way that when the blocking element moves from the starting position into the release position, the spring element is at least temporarily tensioned in such a way that the spring element pushes the blocking element back in the direction of the starting position, wherein the locking device comprises an electro-mechanical actuator, wherein the actuator is designed to move the blocking element in the direction of the release position against the force of the spring element, wherein in the first position, the locking element prevents rotation of the rotor in the stator and in the second, position, the locking element enables rotation of the rotor in the stator, wherein the stator comprises a locking element recess in which the locking element is arranged in the first position, and the locking element is outside the locking element recess in the second position, wherein the actuator rotates the blocking element starting from the starting position under increasing tension of the spring element in the direction of the release position until over a dead centre, wherein after exceeding a dead centre the spring element moves or contributes to moving the blocking element into the release position.

14. An electromechanical locking device for a closure element or for a switching element comprising:

a stator, a rotor, a locking element and a blocking element, wherein the rotor is mounted in the stator, wherein the locking element is movable between a first position and a second position, wherein a starting position and a release position is assumed by the blocking element, wherein in the starting position the blocking element prevents a movement of the locking element into the second position and in the release position the blocking element enables a movement of the locking element into the second position, wherein the locking device comprises a spring element, wherein the spring element interacts with the blocking element in such a way that when the blocking element moves from the starting position into the release position, the spring element is at least temporarily tensioned in such a way that the spring element pushes the blocking element back in the direction of the starting position, wherein the locking device comprises an electro-mechanical actuator, wherein the actuator is designed to move the blocking element in the direction of the release position against the force of the spring element, wherein in the first position, the locking element prevents rotation of the rotor in the stator and in the second, position, the locking element enables rotation of the rotor in the stator, wherein the stator comprises a locking element recess in which the locking element is arranged in the first position, and the locking element is outside the locking element recess in the second position, wherein the locking device comprises an extension element, wherein the extension element is movable between an insertion position and a withdrawal position, wherein the extension element and the blocking element are designed such that the extension element in the insertion position prevents movement of the blocking element from the release position into a blocking position, wherein the extension element blocks the blocking element from being moved from the release position into a blocking position by the force of the spring element.

* * * * *